Patented Aug. 18, 1925.

1,550,077

UNITED STATES PATENT OFFICE.

HARRY J. KIMMEL AND LLOYD A. HARRIS, OF COWELL, CALIFORNIA.

PROCESS FOR MAKING ARTIFICIAL MARBLE.

No Drawing. Application filed May 17, 1923. Serial No. 639,698.

*To all whom it may concern:*

Be it known that we, HARRY J. KIMMEL and LLOYD A. HARRIS, citizens of the United States, and both residents of Cowell, county of Contra Costa, and State of California, have invented a new and useful Process for Making Artificial Marble, of which the following is a specification.

The present invention relates to improvements in the process for making artificial or imitation marble, and its particular object is to provide a method of producing marble of the character described that will resemble natural marble very closely, will present a glossy surface impervious to moisture and will be particularly strong in its construction. Further objects and advantages of our device will appear as the specification proceeds.

The mixture from which my artificial marble is made consists preferably of the following ingredients mixed substantially in the proportions set forth hereinafter: calcined magnesite, 10 pounds, marble dust or sand 3 pounds, Portland cement, 5 pounds, asbestos fiber, 1 quart, magnesium chloride, 10 parts in volume of the total mixture, magnesium sulphate, 1 part in volume of the total mixture and 2 ounces of calcium chloride.

In preparing the mixture we first thoroughly mix the calcined magnesite, the marble dust or sand, and the asbestos fiber. We then separately mix the cement and the calcium chloride. The magnesium sulphate is dissolved in warm water, adding sufficient water to reduce the specific gravity of the solution to 15 Baumé. The magnesium chloride is simultaneously dissolved in water to test .25 by a Baumé hydrometer. The sulphate and chloride solutions are mixed and added to the magnesite material gradually, stirring the mixture continuously until it has a thin batter-like consistency. The cement mixture is then moistened so as to produce a thin plaste whereupon all the ingredients are poured together and mixed thoroughly. For this purpose we preferably use a mixing machine to insure a uniform and thorough mixing.

The mixture is poured into previously prepared forms, which preferably have been previously oiled with a very thin film of lard oil and is worked to remove all air bubbles. Steel reinforcing members of suitable design are then forced down into the mixture to the proper depth to increase the strength of the final material as well as to prevent warping during the drying or curing process hereinafter described.

The forms containing the mixture and the reinforcing members are placed in a room of even temperature of about eighty degrees Fahrenheit for twenty-four hours, which gives sufficient rigidity to the mixture that the forms may be removed. The slabs thus formed are then placed in a drying room of ninety-five degrees Fahrenheit for twenty-four hours, whereupon the heat is gradually increased to one hundred twenty degrees Fahrenheit during an additional period of thirty-six hours. The slabs are then dipped into a tank filled with a size solution. The latter preferably consists of a mixture of 10 parts of white glue, of 5 parts of resin, of 20 parts of turpentine and 65 parts of water. It is prepared by melting the glue in the water and dissolving the resin in the turpentine, and mixing the solution at a boiling temperature. While being used the size solution is kept at boiling temperature and stirred continuously. The imitation marble slabs, after having been dipped into the solution, are raised and allowed to drain for a few minutes until no surplus size shows on the surface, whereupon they are again placed in a drying room for four hours at a temperature of one hundred and twenty degrees. Thereafter the slabs are dipped in a vat of transparent waterproof varnish and rubbed until the desired finish is produced and are again placed in a drying room until the varnish is thoroughly set.

It should be understood that all operations should be performed in a place free from dust.

In view of the fact that magnesite mixtures have been used before for the production of imitation marble, it may be pointed out that aside from the ingredients and the manner of mixing them, the process above described is particularly adapted to produce a superior product due to the curing process employed for the removal of moisture, as well as to the size solution which fills all the pores of the stone to prevent absorption and the final dip solution which acts as a finish and seals the whole surface. The introduction of reinforcing elements is also of considerable importance since it prevents warping during the drying process and protects the finished product against possible cracks during its use.

We claim:

1. The method of curing artificial marble of the character described which consists in allowing a mortar of pasty consistency to dry in forms at a temperature of about 80 degrees for substantially 24 hours, in removing the forms and subjecting the product to a temperature of about 95 degrees for a similar period, and in thereafter gradually increasing the temperature to 125 degrees during a period of about 36 hours.

2. The method of curing artificial marble of the character described which consists in allowing a mortar of pasty consistency to dry in forms at an even temperature for a definite period, in removing the forms and in thereafter subjecting the product successively to controlled temperatures of increasing intensity for definite periods.

3. The process of producing artificial marble which consists in dipping slabs of the character described into a solution of white glue, resin and turpentine kept at boiling temperature, in allowing the slabs to drain and in drying the same at a temperature of substantially 120 degrees Fahrenheit.

4. The process of producing artificial marble which consists in dipping slabs of the character described into a solution of white glue, resin and turpentine kept at boiling temperature, in allowing the slabs to drain, in drying the same by application of heat, in then again dipping the slabs in transparent waterproof varnish and thereafter rubbing the same to obtain a finished surface.

HARRY J. KIMMEL.
LLOYD A. HARRIS.